United States Patent [19]

Marlier et al.

[11] Patent Number: 5,125,061
[45] Date of Patent: Jun. 23, 1992

[54] UNDERSEA TELECOMMUNICATIONS CABLE HAVING OPTICAL FIBERS IN A TUBE

[75] Inventors: Géry Marlier, Calais; Jean-François Libert, Pont de Briques St. Etienne, both of France

[73] Assignee: Alcatel Cable, Cedex, France

[21] Appl. No.: 730,427

[22] Filed: Jul. 16, 1991

[30] Foreign Application Priority Data

Jul. 19, 1990 [FR] France ............... 90 09251

[51] Int. Cl.⁵ ............................... G02B 6/44
[52] U.S. Cl. ................. 385/101; 174/70 R; 385/107; 385/113
[58] Field of Search ........... 350/96.23; 174/70 R, 174/70 S; 385/100, 101, 107, 109, 113

[56] References Cited

U.S. PATENT DOCUMENTS

| 4,278,835 | 7/1981 | Jackson | 174/70 R |
| 4,490,009 | 12/1984 | Nakai et al. | 350/96.23 |
| 4,522,464 | 6/1985 | Thompson et al. | 350/96.23 |
| 4,523,804 | 6/1985 | Thompson | 350/96.23 |
| 4,763,981 | 8/1988 | Wilkins | 350/96.23 |
| 4,765,711 | 8/1988 | Obst | 350/96.23 |
| 4,767,182 | 8/1988 | Parfree et al. | 350/96.23 |
| 4,974,926 | 12/1990 | Blee et al. | 350/96.23 |
| 4,979,795 | 12/1990 | Mascarenhas | 350/96.23 |

FOREIGN PATENT DOCUMENTS

81304 5/1988 Australia.
0371660 6/1990 European Pat. Off..

*Primary Examiner*—John D. Lee
*Attorney, Agent, or Firm*—Sughrue, Mion, Zinn Macpeak & Seas

[57] ABSTRACT

The cable has optical fibers embedded in a material filling the tube which itself lies inside a helical lay of metal wires having high mechanical strength and in which the interstices are filled with a sealing material. The cable includes a first extruded sheath between the tube and the helical lay, and the helical lay is itself covered by a second extruded sheath which is insulating and abrasion resistant, and if the cable is for a remotely-powered link, it includes a conductive strip on the tube or on the first sheath.

6 Claims, 3 Drawing Sheets

UNDERSEA TELECOMMUNICATIONS CABLE HAVING OPTICAL FIBERS IN A TUBE

The present invention relates to an undersea telecommunications cable having optical fibers, the cable comprising a tube containing the optical fibers embedded in a filler material, the tube being disposed inside a helical lay of metal wires having high mechanical strength.

BACKGROUND OF THE INVENTION

Proposals have already been made in Document AU-A-81304/87 for an undersea telecommunications cable including a conductive metal tube surrounding optical fibers embedded in a material that fills the inside of the tube, electrical insulation surrounding the tube which is made of a conductive metal, and at least one layer of metal wires having high traction strength surrounding the installation and constituting protective armoring. However, such a cable does not provide adequate resistance to the possibility of water infiltrating and propagating longitudinally, particularly in the event of an immersed cable being damaged. Further, the metal wires constituting the protective armoring may be corroded on contact with seawater, e.g. by bacterial action, and this corrosion phenomenon may then give rise to molecular hydrogen being evolved which, under certain conditions, can migrate until it comes into contact with the optical fibers where it gives rise to degraded transmission characteristics. In addition, the conductive metal tube containing the fibers makes the structure expensive for a connection that is not remotely powered, or else it requires a different optical module (i.e. the tube containing the fibers) to be used depending on whether or not the link is remotely powered.

Document EP-A-0 371 660 describes an undersea telecommunications cable having optical fibers in a strength tube, which tube is not used for transporting energy, thereby making it possible to leave the central portion of the cable unaltered regardless of whether the cable is used for remotely powering repeaters or regenerators on a given link. That cable includes a dielectric covering the tube, strength armoring on the dielectric, and an outer protective sheath. Where appropriate, that cable is provided with an internal remote-powering conductive layer constituted by a layer of conductor wires made of copper or aluminum and interposed in the dielectric. The dielectric is then made up from two layers, and the remote-power conductors are sandwiched between these two dielectric layers.

An object of the present invention is to satisfy the same object but with a structure that is more compact and easier to implement, and which is cheaper, which structure also serves to minimize or eliminate electric field concentrations that may cause it to be damaged.

SUMMARY OF THE INVENTION

The present invention provides an undersea telecommunications cable having optical fibers, the cable comprising a tube for providing the cable with mechanical strength and for protecting the fibers, the tube containing the optical fibers embedded in a filler material, a helical lay of metal wires having high mechanical strength being disposed about said tube and together with said tube conferring mechanical pressure and traction withstanding characteristics to the cable, a first extruded sheath disposed between the tube and the helical lay, a sealing material in the interstices between the wires having high mechanical strength of the helical lay, a second extruded sheath suitable for withstanding abrasion surrounding said helical lay, the cable further including internal conductive means for remotely powering equipments interposed on the cable, said means being interposed between said armoring and said tube containing the fibers, wherein said conductive means are constituted by a conductive strip of cross-section adapted to the nature of said equipments to be remotely powered, the strip being disposed in contact with one of the inside and outside faces of said first sheath, and wherein said second sheath is also electrically insulating.

In addition, the invention preferably satisfies at least one of the following features:

it includes an interface semiconducting layer between the helical lay and the second extruded sheath, said lay being made of an insulating material filled with conductive particles; and the sealing material is itself filled with conductive particles.

BRIEF DESCRIPTION OF THE DRAWINGS

Embodiments of the invention are described by way of example with reference to the accompanying drawings, in which.

DETAILED DESCRIPTION

Figure 1:
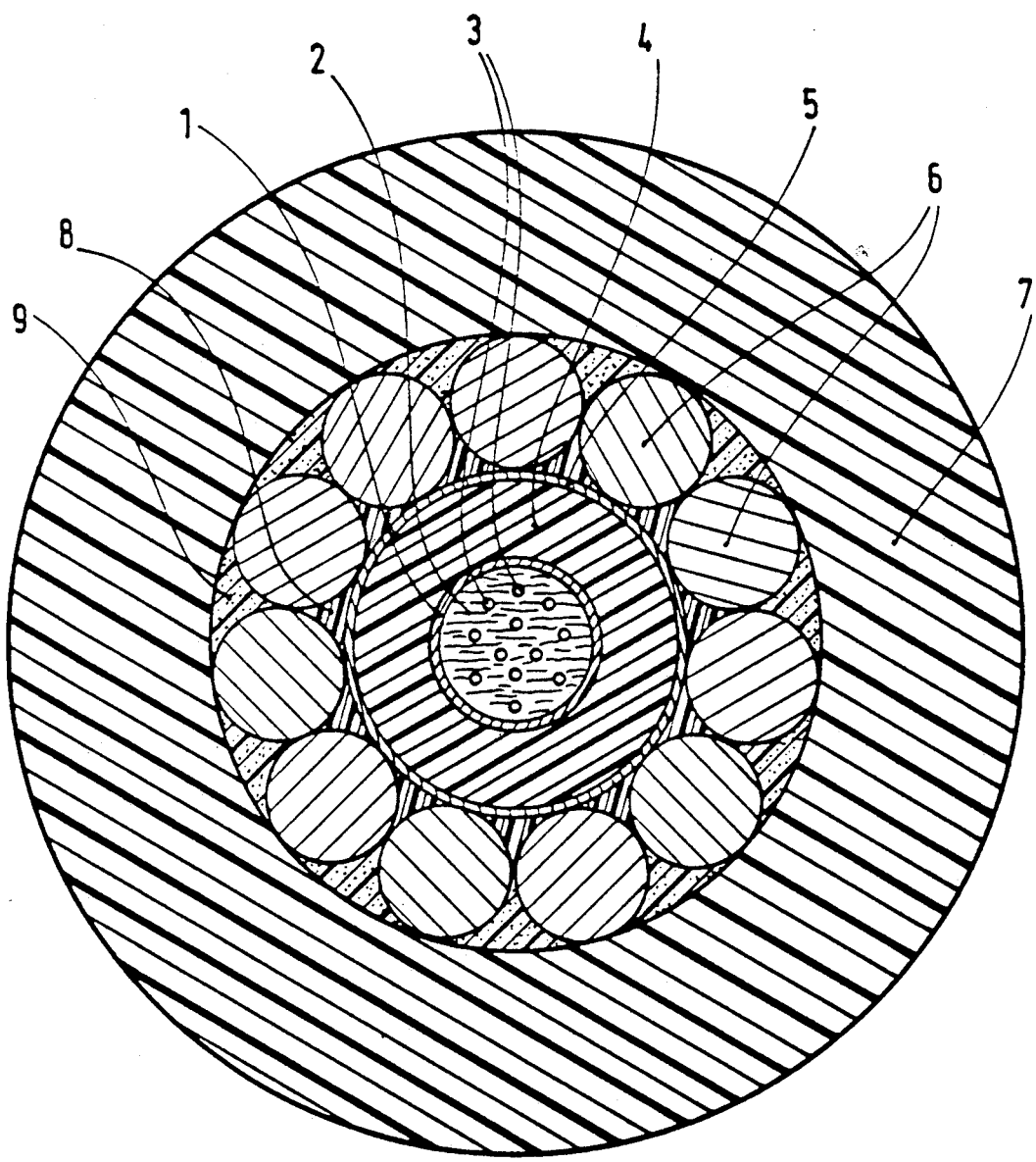
FIG. 1 is a section through a cable of the present invention.
Figure 2:
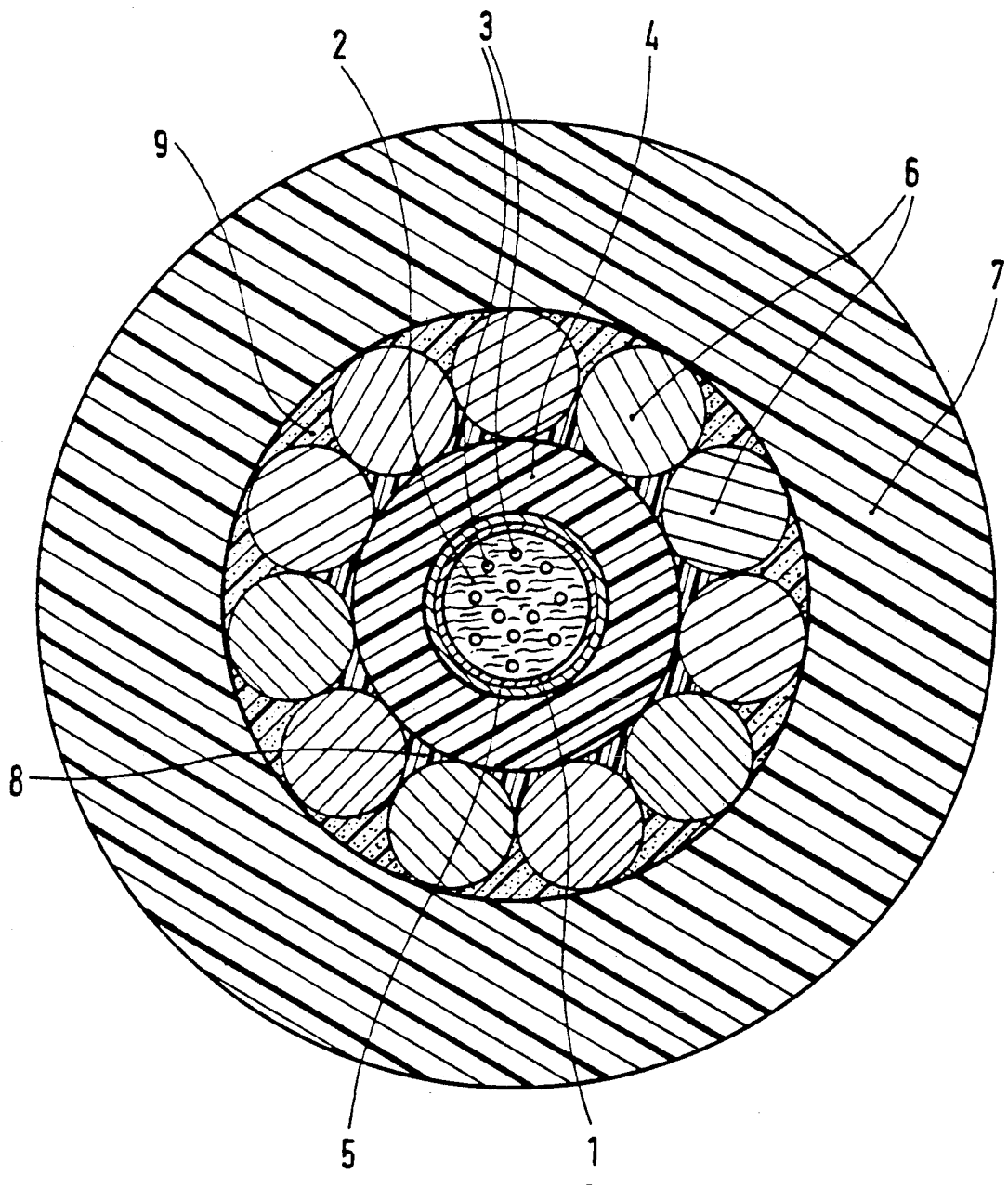
FIGS. 2 and 3 are sections through two variants of the FIG. 1 cable.
Figure 3:
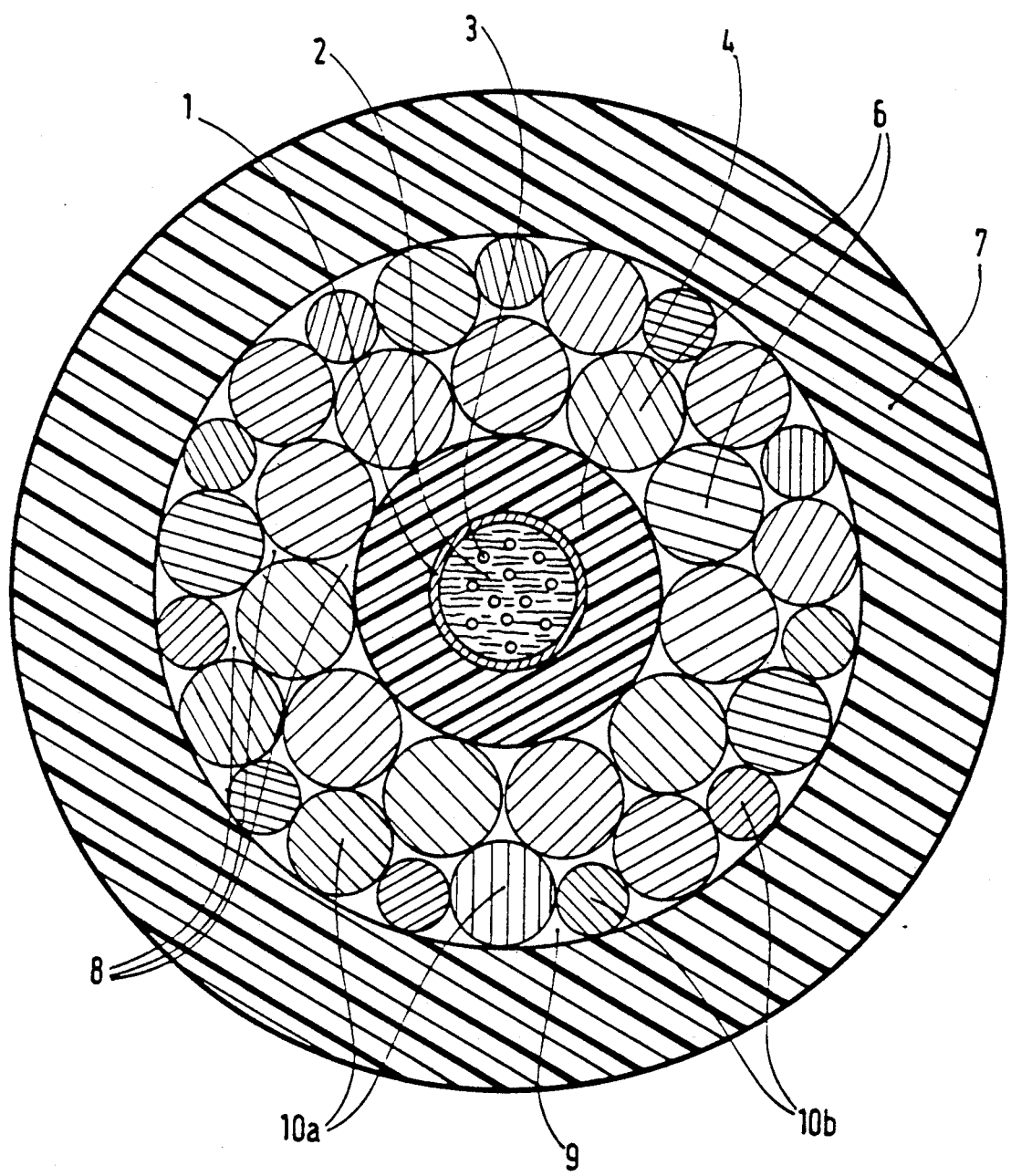

In the figures, the same references are used to designate the same parts; the cable shown in FIG. 1 is described in detail, and only the differences of the variants shown in FIGS. 2 and 3 are specified.

The cable shown in FIG. 1 comprises a tube 1 filled with a sealing compound, e.g. a silica gel 2, having optical fibers 3 embedded therein. The fibers may optionally be in a helical lay, and their length may optionally be greater than that of the tube.

The tube 1 withstands water pressure and is made of metal, preferably of steel. It is longitudinally welded by laser or by arc-welding under inert gas, or by plasma arc, or by any other appropriate method. The tube 1 may also be made of extruded plastic, in which case means are associated therewith as described below for conferring adequate pressure resistance to the cable.

The cable includes a first extruded sheath 4 disposed around the tube 1 and protecting it against corrosion or localized crushing. This first sheath 4 is surrounded by a conductive strip 5 made of copper or aluminum or of some other metal or alloy that is a very good conductor of electricity, and which is used for remotely powering amplifying repeaters or regenerators interposed between lengths of cable in the final undersea link. The conductive strip 5 is welded longitudinally to form a tube surrounding the first sheath, or else it is helically wound in one or more layers on said sheath, or else it is constituted by performed foils placed along the sheath and assembled round it.

A helical lay of metal wires 6 having high mechanical strength, and preferably made of steel, is disposed around the conductive strip 5. The helical lay may constitute a single layer as shown, or it may comprise a plurality of layers which may be laid in the same direction or in opposite directions. The helical lay of steel wires provides the cable with mechanical traction strength. It also has arch characteristics, in particular if the tube 1 is made of plastic and does not have sufficient strength against pressure.

The interstices between the wires of the helical lay and between the helical lay and the strip 5 are filled with a sealing material 8 such as a polyurethane resin or any other material capable of performing this sealing function to resist longitudinal propagation of water along the cable, in particular in the event of the immersed cable becoming damaged.

An outer second sheath 7 made of polyethylene or any other electrically insulating and abrasion-resistant material is extruded as one or more layers over the helical lay. The thickness of the second sheath is a function of the desired degree of electrical isolation and of mechanical protection.

The first sheath 4 essentially serves a packing function to pad out the resulting cable to a diameter that is large enough for it to have satisfactory mechanical behavior for use at great depths.

Advantageously, and as shown, a semiconducting interface layer 9 is interposed between the outer sheath 7 and the helical lay, and it fills the outer interstices between the sheath 7 and the peripheral wires of the helical lay. This layer 9 has very low conductivity, being constituted, for example, by polyethylene filled with conductive particles, and in particular carbon particles. Where applicable, a keying agent is used, e.g. a copolymer, for ensuring adhesion between the semiconducting layer 9 and the wires in the helical lay. The layer 9 serves to avoid intense electric field concentrations appearing at sharp points, since such concentrations risk damaging the outer sheath. This makes it possible to reduce the thickness of the outer sheath 7.

It is also advantageous for the sealing material 8 to be filled likewise with conductive particles, in particular when the conductive strip 5 is taped or is otherwise not perfectly smooth so as to avoid any electrical problems at the interface between the conductive strip and the helical lay.

The cable shown in FIG. 2 differs from that of FIG. 1 in that the conductive strip is disposed directly on the tube 1 containing the optical fibers and is surrounded by the first extruded sheath 4. In this case, the first sheath 4 may optionally provide electrical insulation between the conductive strip 5 and the wires of the strength armoring.

It is specified that in these two embodiments, the thickness of the conductive strip in the space between the helical lay of wires 6 and the tube 1 is selected to obtain an appropriate electrical resistance, with the first extruded sheath 4 then occupying the remaining space.

In a variant (not shown) of the cables shown in FIGS. 1 and 2, when an undersea link is not remotely powered, the corresponding cable has the same central module defined by the tube 1 containing the embedded fibers, but the cable does not have the above-mentioned conductive strip 5 covered by the first sheath 4 or covering it, nor does it have the above-mentioned interface semiconducting layer 9 between the helical lay and the outer sheath 7. Such a variant cable has sealing material 8 in the interstices between the wires of the helical lay, but this material is not filled with conductive particles.

The cable shown in FIG. 3 differs from that of FIGS. 1 and 2 in that it has no conductive strip 5, but has a helical lay which comprises not only the wires 6 made of a metal having high mechanical strength, but also a preferably peripheral layer comprising conductor wires 10a alternating with wires 10b made of a metal having high mechanical strength, the conductor wires serving to provide remote power for regenerators in the final link. The interstices between the wires of the helical lay and between the lay and the tube 1 are filled with a sealing material (not shown) optionally filled with conductive particles, and the outer interstices between the peripheral wires of the helical lay are filled with a semiconducting layer (not shown). The central module defined by the tube 1 together with the fibers embedded therein also remains unchanged.

With reference to the various examples of cable described above, it appears that the existence, the nature, and the cross-sectional areas of the conductive means can be modified to suit the remote-powering requirements of the system without it being necessary to take action on other component parts of the cable. In particular, the cross-sectional area of the conductive means may be zero for systems that do not include repeaters, may be small for systems having optical amplifiers, or may be normal for systems having regenerators. The resistance of the cable to hydrogen and to pressure is not altered thereby.

We claim:

1. An undersea telecommunications cable having optical fibers, said cable comprising: a tube for providing the cable with mechanical strength and for protecting the fibers, said tube containing the optical fibers embedded in a filler material, a helical lay of metal wires having high mechanical strength, a first extruded sheath disposed between the tube and the helical metal wire lay, a sealing material in the interstices between the wires having high mechanical strength of the helical lay, a second extruded sheath for withstanding abrasion surrounding said helical lay, internal conductive means for remotely powering equipments interposed on the cable, said internal conductive means being interposed between said helical lay of metal wires and said tube containing the fibers, said internal conductive means being constituted by a conductive strip of a cross-section suitable for said equipments to be remotely powered, said strip being disposed in contact with one of an inside and an outside face of said first sheath, said second sheath also being electrically insulating, and a semiconducting interface layer between the helical lay and said second extruded sheath, said interface layer filling the outer interstices between the wires of the helical lay and adhering to said peripheral wires, and wherein the sealing material in the interstices between the wires having high mechanical strength of the helical lay resists longitudinal propagation of water along the cable in the event the immersed cable becomes damaged, and wherein said semiconductor interface layer prevents intense electrical field concentration appearing at sharp points which can damage the outer sheath thereby permitting reduction in thickness of the outer sheath.

2. A cable according to claim 1, wherein said conductive strip is disposed on said tube containing the fibers and is welded longitudinally or helically wound in one or more layers or is placed along said tube, and is covered by said first sheath.

3. A cable according to claim 1, wherein said conductive strip is disposed on said first sheath and is welded longitudinally or is helically wound in one or more layers or is placed along said first sheath which is itself directly extruded on said tube containing the fibers.

4. A cable according to claim 1, wherein said semiconducting layer is made of polyethylene resin filled with conductive particles.

5. A cable according to claim 1, wherein said sealing material is filled with conductive particles whereby said sealing material avoids electrical problems at the interface between the conductive strip and the helical lay.

6. A cable according to claim 1, wherein said tube containing the fibers is made of metal and withstands pressure, or is made of plastic, in which case said helical lay of metal wires having mechanical strength and occupying at least one layer constitutes an arch around the plastic tube.

* * * * *